Feb. 4, 1969    R. L. CARLSON    3,426,343
SELF-CONTAINED SIGNAL LIGHT UNIT
Filed Oct. 22, 1965    Sheet 1 of 2

INVENTOR.
ROBERT J. CARLSON
BY Harry M. Saragovitz
Edward J. Kelly, Herbert Berl
J. S. Dubroff
ATTORNEYS Feb. 4, 1969 R. L. CARLSON 3,426,343
SELF-CONTAINED SIGNAL LIGHT UNIT
Filed Oct. 22, 1965 Sheet 2 of 2

INVENTOR.
ROBERT J. CARLSON
ATTORNEYS

United States Patent Office 3,426,343
Patented Feb. 4, 1969

3,426,343
SELF-CONTAINED SIGNAL LIGHT UNIT
Robert J. Carlson, 477 Foothill Road,
Somerville, N.J. 08876
Filed Oct. 22, 1965, Ser. No. 502,745
U.S. Cl. 340—321
Int. Cl. G08b 23/00; F21l 7/00
4 Claims

ABSTRACT OF THE DISCLOSURE

A self-contained outdoor warning and marking light unit operated by a low-voltage battery of relatively large size and mass providing low center of gravity in the unit and stabilizing means for improved wind resistance. The battery is mounted in the bottom of a short cylindrical outer casing for the unit in the top of which is provided a folded plastic translucent cone and a compressed conical erecting spring therefor which is released by a detachable top cover element to expand and extend the cone in a vertical position above the casing. This action operates a switch for energizing an inner electric lamp from the battery and thereby illuminating the cone. The cone, spring and lamp are provided as a separate pan or tray unit fitting into the top of the casing with a waterproof seal.

---

The invention described herein may be manufactured and used by or for the Government for governmental purposes without the payment to me of any royalty thereon.

The present invention relates to signal lights of the self-contained unitary type particularly adapted for night signals and marker use.

It is an object of this invention to provide an improved self-contained signal light unit that is adapted for military and outdoor use as a versatile, low cost, night signal or marker light.

It is also an object of this invention to provide an improved signal light unit of the type referred to that is relatively small and compact when not in use while being readily adapted for use as a highly visible marker for trails, roads, boundaries, water channels and the like, and as a distress or warning signal.

It is a still further object of this invention to provide an improved signal light unit of the type referred to which is waterproof with a low center of gravity and when not in use is small and easily carried or stored.

While there are many makes of signal lights on the market or commercially available, there is a military and outdoor need for a versatile night signal or marker light for disabled vehicles, road hazards and the like, and as a marker light to guide vehicular and like traffic flow, to block off a road or route, and for temporary aircraft landing strip boundaries and the like.

The signal light unit of the present invention is adapted for use with a battery of the low-voltage type and of relatively large size and mass providing a low center of gravity in the unit and a large reserve and long-lasting lighting capacity. Heretofore signal lights of the battery operated type have been provided with a lens face of relatively small diameter or size which does not always attract attention and having a relatively low lighting reserve power. Road flares of the burning type are generally short lived and must be replaced often in use. Longer burning crude oil lamps and the like require constant servicing to maintain their operating efficiency and are not adapted for military use in the field.

The signal light unit in the present invention is not only self-contained and battery-operated but is provided in a relatively small casing having a top portion containing a folded plastic translucent cone and a compressed conical erecting spring therefor which is released by a cover element to expand and extend the cone in a vertical position above the casing while at the same time an inner electric lamp is illuminated by a switch closing a circuit therewith to the battery. The unit is adapted to be provided with a polystyrene floatation ring or element whereby it is adapted for stabilization in the water as a channel marker and the like. The cone, spring and lamp are provided as a separate pan or tray unit fitting into the top of the casing with a tight waterproof seal and the base of the cone is also provided with a waterproof seal to an inner base unit or insert.

When opened and in use the signal light unit presents a large colored (red, yellow or like) cone of light which attracts attention and is easily seen even from a distance. The large battery element provides a low center of gravity for stabilization and prevents movement even by high winds. The unit is designed to be fabricated from low cost materials with a minimum of assembly operations. The commercial battery is by far the most expensive part of the unit and the unit can be placed in a throw-away category when the battery is expended, although the battery can easily be replaced if so desired.

The invention will further be understood from the following description, when considered with reference to the accompanying drawings, and its scope is pointed out in the appended claims.

Figure 1:
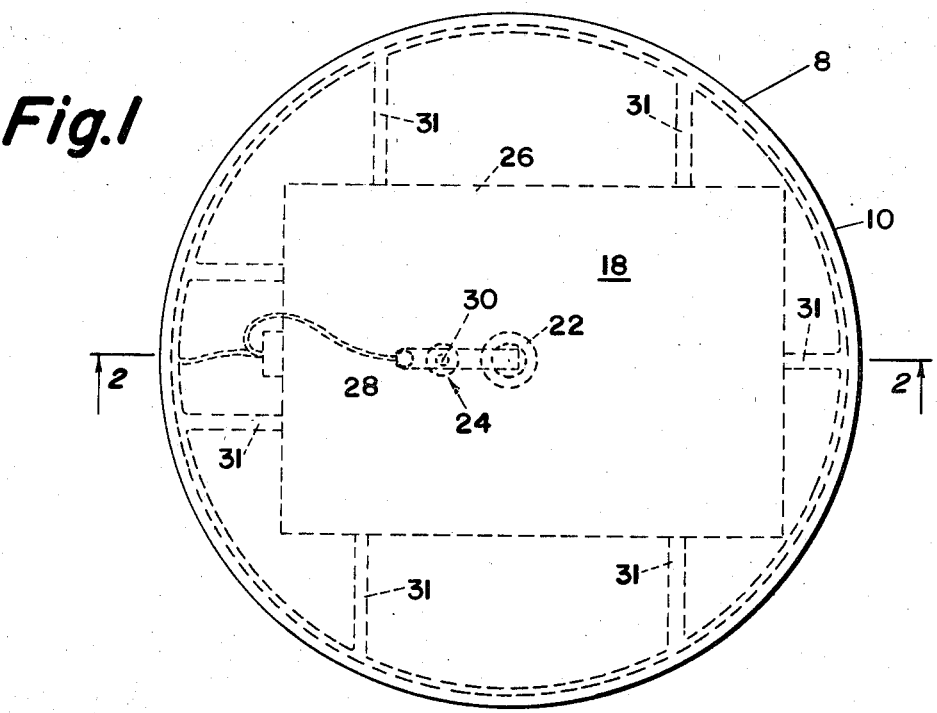
FIG. 1 is a top view of a signal light unit embodying the invention.
Figure 2:
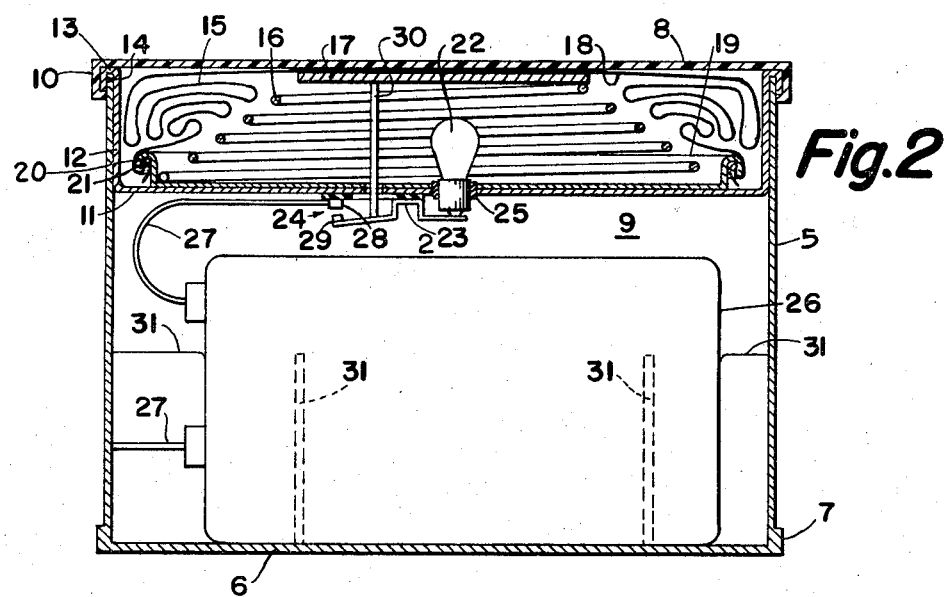
FIG. 2 is a cross-sectional view of the unit of FIG. 1 taken on the section line 2—2 and further showing the construction thereof in accordance with the invention.

Referring to the drawings wherein like parts throughout the various figures are indicated by like reference numerals, and referring particularly to FIGS. 1 and 2, a thin walled cylindrical outer casing 5 is provided with an integral base 6 at its lower or bottom end and outer annular flange 7 on the base, while the upper end is provided with a removable snap-on cap or cover 8 having a curled peripheral edge or locking bead 10 thereon.

A cup-shaped inner cover or partition element 11 having an elongated cylindrical body or flange 12 is made to fit against the interior wall of the casing 5. The element 11 has a curled upper edge 13 at its open end providing a locking bead for seating on and gripping the casing at its open upper end 14.

A folded expanding plastic cone 15 of translucent material is provided with an expanding inner conical activating spring 16 is mounted coaxially thereon and compressed between a top pressure plate or spring seat 17, seated in the upper truncated flat end 18 of the cone 15 and a cup-shaped base or seat, 19, for the cone and spring. The base 19 has a curled edge or bead 20 for locking the cone 15 thereto through the use of a retaining ring 21 which may be of rubber or other like elastic material.

An electric lamp 22 is mounted in the center of the inner cover or partition element 11 or on the axis of the casing in a vertical position as indicated. The lamp is provided with an end terminal conductor or contact 23, a lamp switch 24 which is normally open, and a receptacle 25 which also provides a ground connection therewith through contact with the inner cover or position element 11 which may be of the same material as the casing, that is conductive metal.

In the lower compartment 9 of the casing, below the supporting structure or partition element 11, is mounted a relatively large battery element 26 which may be of the 6 volt type and provides a large weight or mass for stabilizing the unit and preventing its movement in the wind. The battery is provided with output leads 27, one of which is connected with the fixed switch contact 28 while the other is connected directly to the casing 5. A movable contact 29 of the switch is connected with the conductor or contact 23 and is actuated by an axially-movable operating element or rod 30. The latter is guided through aligned openings in the spring seat or base 19 and the element 11 and is engaged by the plate 17 when the top cover 8 is in place. This depresses the contact 29 and causes the switch to be normally open when the unit is closed as shown in FIG. 2. Battery retaining ribs indicated at 31 are provided integrally with the casing to maintain the battery in a normally centered position in the casing. The present ribs are provided for holding a normal #10 6 volt battery. The number and size of the holding means will vary with different battery sizes, as is understood.

Figure 3:
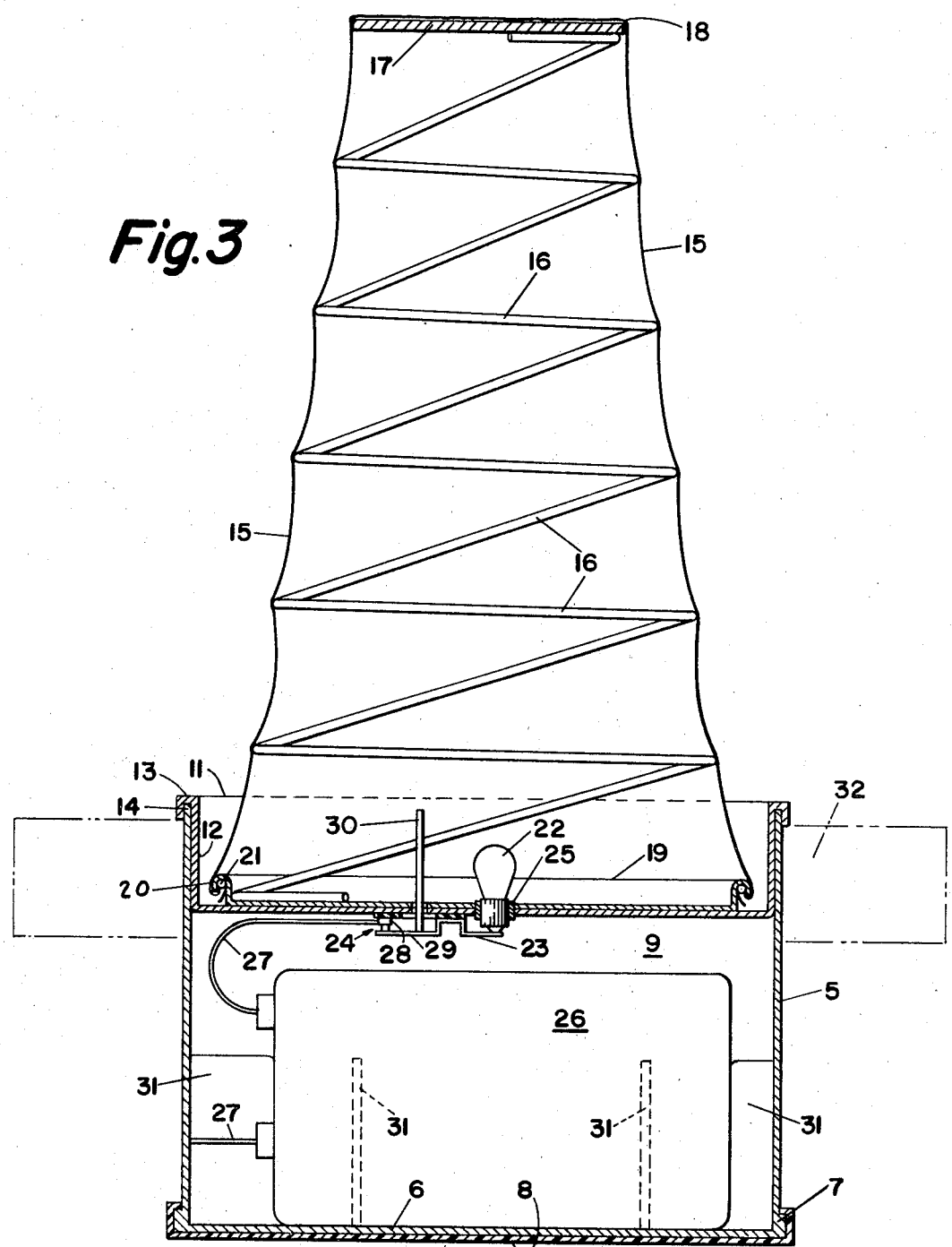
FIG. 3 is a further cross-sectional side view of the unit of FIG. 1 and arranged in accordance with FIG. 2 showing the unit in an open or expanded position for operation.

The unit is waterproof with a low center of gravity, and by sliding on a polystyrene ring or the like having a relatively high degree of buoyancy, over the outside of the casing or container to stabilize and float the unit, it can be used as a channel marker to guide small craft. This polystyrene, or like, ring is indicated in outline form at 32 in FIG. 3 to which attention is now directed as being in the operating position with the cone and spring elements extended as shown. When opened and in use, the unit presents a large colored (red) cone of light from the lamp 22 shining through the translucent cone 15 which stands distended in an elongated truncated form to a height dependent upon the space provided for the folded cone and for the spring in the casing. The heavy battery provides the low center of gravity and renders the unit stable and not easily moved even by high winds when the cone is extended as shown. The unit may be fabricated from low cost materials with a minimum of assembly operations. The commercial battery is the most expensive part of the unit, and therefore the unit, when the battery is expended, can be placed in a throw-away category, although the battery is easily replaced if so desired.

As a warning light, the unit may be placed from 50 to 100 feet to the rear of a disabled military vehicle or other vehicles to warn approaching traffic. It may be placed near road hazards and obstacles etc. As a mounting light it may be used to channel traffic flow at congested areas. It may be placed so as to block off a road or route. It may be used to mark the boundary of a temporary aircraft landing strip and the like.

When the unit is not in use it is relatively small in size and easily carried or stored, while in use it presents a relatively large cone of light, being much larger and more effective than any prior known device of this type and more easily serviced and cared for. With the floatation ring 32 in place it becomes an effective channel marker for navigable waters as a warning for craft in waters, harbors and the like, or where a ship or other craft is anchored.

I claim:
1. A self-contained signal light unit comprising in combination, a relatively-short cylindrical container having a flanged base on which it is left to stand in operation and an open upper end having a snap-on detachable top cover,
   an operating battery element of relatively large mass and weight mounted in the lower portion of the casing adjacent to the base to provide a low center of gravity for said unit and stabilizing means therefor in the presence of wind,
   a depending cup-shaped inner cover and partition element above the battery element having an elongated cylindrical flange fitting the interior walls of the casing with a curled edge at its open upper end providing a locking bead for gripping the top edge of the casing in a water-tight seal therewith to seal off and protect the battery,
   a folded expanding truncated plastic cone of colored translucent material mounted in the cup shaped inner cover and partition element and connected therewith at its open base end in a water-tight seal,
   an inner conical activating and expansion spring compressed within the folded plastic cone to raise and hold it in an extended vertical position on said inner cover and partition element,
   a top plate mounted between the spring and said cone as a spring seat therefor at the upper end of said cone,
   a battery-type electric lamp and a control switch therefor mounted on and carried by said inner cover element within and enclosed by said cone,
   said switch having an operating element engaging the top plate to hold the switch in the open position with the detachable top cover in place,
   circuit means connecting the battery with said lamp through said switch, and
   said folded cone and compression spring being held in a compressed position with said top cover in place and releasable thereby when detached to assume said extended vertical position and be illuminated as a relatively large cone of light by closure of said switch and energization of said lamp therein.

2. A self-contained outdoor warning and marking light unit comprising in combination, a relatively-short cylindrical casing having a closed base end and an open top,
   an operating battery element of relatively-large mass and weight mounted in the lower portion of said casing close to said base end and providing a relatively low center of gravity and stabilizing means for retaining said unit in place in operation in the presence of high winds and the like,
   a cup-shaped inner cover and partition element depending within and closing said open end of said casing and having a beaded edge providing a substantially waterproof joint therewith to seal off the battery element in said lower portion of the casing,
   an operating lamp and control switch therefor carried by said cover and partition element,
   circuit means connecting said lamp with said battery through said switch,
   an elongated truncated cone of translucent plastic material secured at its base end to said inner cover and partition element in substantially coaxial relation to said casing,
   an inner conical expanding spring for said truncated cone having an upper pressure plate engaging the truncated upper end of said cone to extend it to its full length and height in response to expansion of said spring,
   said cone and spring being compressible to fold within said cup-shaped inner cover and partition element,
   a detachable snap-on outer flat top cover for said casing adapted in the attached position to hold said cone and spring in the compressed position within said inner partition element,
   an actuating element for said switch positioned to hold said switch in the open position with said top cover in place to close the unit,
   and said cone and spring being released to extend upon detachment of said snap-on cover and to close said switch, whereby said unit is illuminated to provide an elongated truncated cone of light in a warning and marking light having a relatively low center of gravity and high stability in the wind.

3. A self-contained outdoor warning and marking light unit as defined in claim 2, wherein the casing is provided with an annular outer bottom flange around the base end for receiving and holding said detachable top cover when not in use as a cover element, and wherein interior means are provided for holding said battery in a fixed stabilized position within said casing.

4. A self-contained signal light unit as defined in claim 2, wherein a detachable outer annular ring of material having a relatively high degree of buoyancy in water and adapted for immersion therein without deterioration in use is provided for and mounted coaxially on said casing as a water stabilizing and flotation means, and wherein said ring is of relatively larger diameter and relatively thin to provide an enlarged area of contact with the water surface.

References Cited

UNITED STATES PATENTS

| | | | |
|---|---|---|---|
| 2,607,837 | 8/1952 | Federuk | 340—63 X |
| 2,647,254 | 7/1953 | Brunnhoelzl | 340—321 |
| 3,181,135 | 4/1965 | Zoglio | 325—112 X |
| 3,202,979 | 8/1965 | Lemelson | 340—321 |

FOREIGN PATENTS 453,702  4/1913  France.

JOHN W. CALDWELL, *Primary Examiner.*

C. M. MARMELSTEIN, *Assistant Examiner.*

U.S. Cl. X.R.

240—10.61, 36